United States Patent
Taylor et al.

(10) Patent No.: US 12,385,592 B2
(45) Date of Patent: Aug. 12, 2025

(54) INSULATING JACKET FOR A FILTER

(71) Applicant: ADEY HOLDINGS (2008) LIMITED, Stonehouse (GB)

(72) Inventors: Matt Taylor, Stonehouse (GB); Nick Bray, Stonehouse (GB)

(73) Assignee: ADEY HOLDINGS (2008) LIMITED, Stonehouse (GB)

( * ) Notice: Subject to any disclaimer, the term of this patent is extended or adjusted under 35 U.S.C. 154(b) by 539 days.

(21) Appl. No.: 17/834,182

(22) Filed: Jun. 7, 2022

(65) Prior Publication Data

US 2022/0397226 A1 Dec. 15, 2022

(30) Foreign Application Priority Data

Jun. 10, 2021 (GB) ..................................... 2108315

(51) Int. Cl.
*F16L 59/02* (2006.01)
*B03C 1/28* (2006.01)
*C02F 1/48* (2023.01)

(52) U.S. Cl.
CPC ............ *F16L 59/024* (2013.01); *B03C 1/286* (2013.01); *B03C 1/288* (2013.01); *C02F 1/482* (2013.01); *B03C 2201/18* (2013.01); *B03C 2201/28* (2013.01)

(58) Field of Classification Search
CPC ........ F16L 59/024; F16L 59/14; B03C 1/286; B03C 1/288; F24D 19/0092; B01D 35/18; B01D 35/06; B01D 35/30; C02F 1/48
See application file for complete search history.

(56) References Cited

U.S. PATENT DOCUMENTS

| | | | | |
|---|---|---|---|---|
| 5,354,462 A | * | 10/1994 | Perritt | ................... B03C 1/0332 |
| | | | | 184/6.25 |
| 6,398,835 B1 | | 6/2002 | Rehil | |
| 6,461,287 B1 | * | 10/2002 | Glater | ..................... B01L 9/523 |
| | | | | 494/83 |

FOREIGN PATENT DOCUMENTS

| | | | | |
|---|---|---|---|---|
| CN | 101296869 A | 10/2008 | | |
| CN | 102066824 A | 5/2011 | | |
| CN | 104334282 A | 2/2015 | | |
| CN | 106090533 A | 11/2016 | | |
| CN | 106523855 A | 3/2017 | | |
| CN | 208244241 U | 12/2018 | | |
| CN | 109414709 A | 3/2019 | | |
| CN | 110393972 A | 11/2019 | | |
| CN | 110582355 A | 12/2019 | | |
| CN | 111895224 A | 11/2020 | | |
| DE | 202013002350 U1 | 6/2014 | | |
| DE | 102016011774 A1 | 4/2018 | | |
| GB | 813288 A | 5/1959 | | |
| GB | 2255293 A | * 11/1992 | .............. C02F 1/482 | |
| GB | 2573117 A | * 10/2019 | ............ B01D 35/06 | |
| GB | 2573439 A | 11/2019 | | |
| GB | 2573440 A | 11/2019 | | |

(Continued)

*Primary Examiner* — Liam Royce
(74) *Attorney, Agent, or Firm* — Jacob M. Ward; Ward Law Office LLC

(57) ABSTRACT

An insulating cover for a central heating system filter is provided in two parts. The insulating cover may be made from, for example, expanded polypropylene foam. The cover may include magnets for attracting and retaining magnetic debris within the filter. The cover may include a leadscrew arrangement to assist with removal of the cover from the filter for servicing.

6 Claims, 4 Drawing Sheets

(56) References Cited

FOREIGN PATENT DOCUMENTS

| | | |
|---|---:|---|
| GB | 202100861 | 3/2021 |
| RU | 174567 U1 | 10/2017 |
| RU | 192070 U1 | 9/2019 |
| WO | 2021105675 A1 | 6/2021 |

* cited by examiner

INSULATING JACKET FOR A FILTER

CROSS-REFERENCE TO RELATED APPLICATIONS

This application claims priority to United Kingdom Patent Application No. GB2108315.9, filed Jun. 10, 2021. The entire disclosure of the above application is incorporated herein by reference.

FIELD

The present invention relates to an insulating jacket or cover for a filter, particularly for a filter used in a commercial central heating and/or cooling system.

BACKGROUND

A central heating and/or cooling system includes a boiler/cooler, i.e. a heat source and/or sink, a number of radiators or similar in-room heat exchangers, and a circuit of pipework. Heating fluid, normally treated water, is circulated around the circuit by a pump.

It is well-known to include filters of various kinds in heating/cooling circuits. Magnetic filters are used to remove "magnetite", i.e. iron oxide sludge which is caused by internal corrosion of radiators, from the system water. Especially in larger commercial systems, a mesh or gauze filter is often used to capture particles, whether magnetic or not, which are entrained in the heating fluid.

Larger commercial systems, i.e. heating systems in medium-sized buildings, larger than a typical house, often have a boiler room or plant room to house the boiler and other system components. The boiler room or plant room may be in a basement or annex. It is usually unoccupied and does not need to be heated itself, except to protect the system from very cold (freezing) temperatures. Heat losses from components within the boiler room therefore serve no useful purpose and only reduce the overall efficiency of the central heating system.

Insulating jackets are known but can obstruct access to system components when it is required for maintenance or servicing. A filter of any type usually needs to be serviced on a regular basis to remove the captured particles. Removing the insulating jacket to service the filter and replacing it properly afterwards may be a fiddly job and may not always be done correctly, every time the filter is serviced. This can leave an uninsulated filter, reducing the system efficiency.

It is known to retro-fit magnetic filters to old heating systems, especially when another system component such as a boiler or a pump has been or is going to be replaced. Modern high-efficiency boilers are particularly prone to damage caused by magnetite because of the narrow channels in the heat exchanger. It may therefore be that a "dirty" system has been functioning well with an old boiler, but will need to be cleaned to work with a more modern boiler. To avoid damage to the new boiler, sometimes the filter is installed well in advance of the boiler replacement, to clean up the system while it is still running with an old boiler, so that the water is substantially free from magnetite when the new boiler is installed. However, installing a new magnetic filter is a significant job in itself, in particular because it may involve draining the system circuit or at least part of the circuit. A large volume of contaminated water may need to be disposed of and the system then needs to be re-filled, re-treated, and bled free of air. Therefore it is less costly, though less effective at protecting the new boiler, to install the filter at the same time as installing the new boiler rather than a few months beforehand.

It is an object of the invention to solve these problems.

SUMMARY

According to the present invention, there is provided an insulating cover for a central heating system filter, the insulating cover being made from a resilient insulating material, and being provided in two parts, the two parts of the cover being releasably attachable to each other by resilient clips, the two parts of the cover substantially surrounding at least part of the filter, and being retained around the filter, when the two parts of the cover are attached to each other by the clips, and the cover being removable from the filter by releasing the attachment of the two parts of the cover to each other.

The two-part cover forms a shell around the filter, when fitted. When the two parts of the cover are placed around the filter and attached together, the cover is retained on the filter. The cover can be removed from the filter by detaching the two parts from each other.

The insulating material may be for example expanded polystyrene or polypropylene. These are durable insulating materials which are also slightly resilient. The clips may be integrally formed as part of the cover.

Each clip may be formed as an extension from a face of one of the two parts of the insulating cover, the extension being thinner close to the face of the cover and having an overhang at a distal end of the extension. The other one of the two parts may have a slot corresponding to the shape of the clip. Preferably, the two parts are identical but when one is rotated 180 degrees to face the other, the clips on each part line up with the respective slots on the other part.

Preferably, an arrangement of magnets is provided on an inside surface of the two-part cover, the magnets facing towards the filter in use. The two-part cover may be used not only to insulate the filter, but also to add a magnetic capture capability. This has been found advantageous both for filters which do not already have an internal magnet, and on filters which have an internal magnet already, to boost the performance of the filter, i.e. to increase the amount of magnetite which is removed from the heating fluid by the filter.

The magnets are preferably arranged in pairs, each magnet being in the form of a substantially cylindrical billet, joined together by a ferromagnetic carrier. The carrier joins the magnets together at ends of the magnets which face away from the filter in use. This focuses the magnetic field towards the filter.

The pairs of magnets may be mounted on springs which urge the magnets towards the filter in use. The spring may be disposed behind the carrier (i.e. on the side of the carrier facing away from the filter). A force transfer element may be provided in front of the carrier (i.e. between the carrier and the filter), to push the magnets away from the filter when the two-part cover is removed from the filter. The force transfer element may also provide a pivot on which the magnet pair may rotate slightly. Each pivot may be offset so that one magnet of the pair will tend to come away from the filter before the other magnet of the pair. The offsets of the pivots may be alternated on the two-part cover which assists with evening-out the forces when the cover is removed from the filter, against the magnetic attraction of the magnets to the magnetite inside the filter. This arrangement of pivots, springs and magnet pairs is described in more detail in GB2573439 and GB2573440.

The force transfer element may be fixed to the cover by screws. The screws may be inserted from behind, i.e. from the side of the cover facing away from the filter. Preferably, two screws are provided to retain each force transfer element, one at each end of the force transfer element. Since the force transfer element passes across the magnet carrier, one screw will be disposed on either side of the magnet carrier.

An apertured plate may be provided behind the cover where the screws to fix the force transfer element are inserted. In other words, a part of the cover may be sandwiched between the force transfer element and the apertured plate. Preferably, one apertured plate is provided corresponding to each force transfer element. Therefore the apertured plate has two apertures to receive two screws. The plate may be made for example from stainless steel. The plate acts like a washer and provides a reaction surface against the screw heads, bearing in mind that the cover itself is likely to be made from a relatively soft insulating material such as expanded polystyrene or polypropylene.

A cap may be provided over the screws. The cap may be made from substantially the same material as the rest of the two-part cover, for example expanded polystyrene or polypropylene. The cover therefore provides for continuous insulation over the whole surface of the filter, including the parts where the magnets are located. In addition, providing a cap over the screws hides the screws from view. The screws which hold the magnets are unlikely to ever need to be unscrewed (unlike the leadscrews described below) and therefore covering them up avoids any confusion which could result in damage.

Multiple caps may be provided on each part of the two-part cover, to cover up all of the screws which retain the force transfer elements.

Preferably, one or more leadscrew arrangements are provided on each part of the two-part cover. A leadscrew arrangement comprises a screw which can be rotated from the back of the cover (i.e. from the exposed side of the cover facing away from the filter when the cover is fitted) to move the screw out of the front of the cover, and against the outer surface of the filter. This has the effect of pushing the cover away from the filter. This is useful, especially where magnets are provided, since there may be significant forces between the magnets and magnetite which has been captured inside the filter, which will tend to retain the cover against the filter. The leadscrew arrangement may include a female threaded plate on the side of the cover facing towards the filter. The plate may be held in place relative to the cover for example by way of resilient clips integrated into the cover.

An elastomeric cap may be provided on the end of the leadscrew. This protects the filter from damage from the end of the leadscrew bearing against the surface of the cover. In some embodiments the elastomeric cap may also prevent the leadscrew being unscrewed out of the plate, thus retaining the screw as a permanent part of the cover.

In use, the two parts of the two-part cover may be installed around a filter. The filter may already have a magnet inside, or alternatively be a purely mechanical filter containing a mesh or gauze. The two parts are clipped to each other by way of the resilient clips, and this retains the cover to the filter. Typically the filter is roughly cylindrical with fittings on the top, at an end of the cylinder, and with a drain valve at the bottom. The cover is shaped to substantially cover at least the sides and the bottom of the filter. Space may need to be left at the top where the filter is connected to pipework. However, the filter may have a flanged section near the top of the filter, and the two-part cover may include a slot on each part corresponding with the flange. This prevents the cover moving in an axial direction with respect to the filter. Therefore, when the parts of the cover are clipped to each other, the cover is retained to the filter.

The cover insulates the filter, and the magnets in the cover attract and retain magnetite. The magnetite will collect in the filter. After an interval, the filter will need to be serviced to remove this captured magnetite as well as anything else captured in the filter.

The filter can be isolated using valves. Once the filter is isolated from the heating system, the cover can be removed. This may require significant force due to the magnetic attraction between the magnets and the captured magnetic debris, but by using the leadscrews removing the cover is easy. The filter can then be cleaned in whatever way is most appropriate for the type of filter. This may be by draining the filter and then flushing it through, or may be by opening up the filter. When the retained debris is removed, the cover can be put back on and the valves opened again.

DESCRIPTION OF THE DRAWINGS

For a better understanding of the present invention and to show more clearly how it may be carried into effect, embodiments will now be described by way of example only with reference to the accompanying drawings, in which.

DETAILED DESCRIPTION OF THE EMBODIMENTS

Figure 1:
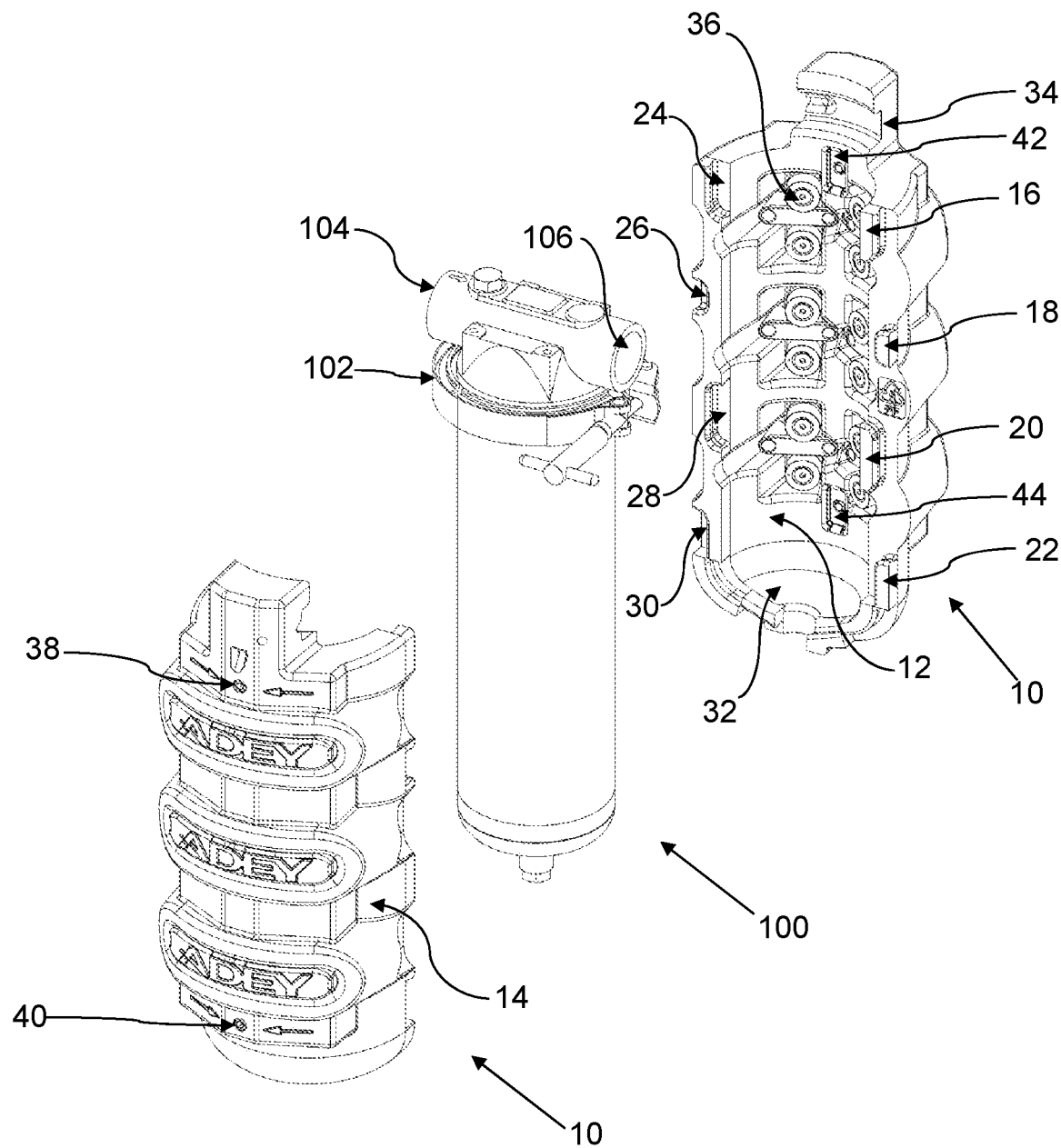
FIG. 1 shows a filter for a central heating system and an insulating cover according to the invention, ready for installation on the filter.

Referring firstly to FIG. 1, a filter for a heating system is indicated at 100. In this case, the filter already contains an internal magnet to capture magnetite within the filter, but equally the insulating cover of the invention could be used with a non-magnetic filter, e.g. a filter having a mesh or gauze, or using for example a hydrocyclone separator.

An embodiment of an insulating cover according to the invention is provided in two parts, each part indicated at 10. In this embodiment, each of the two parts is in fact identical. As shown in FIG. 1, one part may be rotated 180 with respect to the other part, for the parts to fit together. In particular each part 10 comprises a substantially half-cylindrical shell having a curved internal cylindrical surface 12 and a curved external cylindrical surface 14, and a flat face 16 corresponding to a plane bisecting (what would be) the cylindrical shell. The parts 10 are made from expanded polypropylene. This is a durable and slightly resilient rigid foam material with good thermal insulation properties.

The flat face 16 is roughly "U" shaped. Along one "arm" of the "U" a series of resilient clips 16, 18, 20, 22 in the form of protrusions are provided. Each of the resilient clips is formed integrally with the expanded polypropylene cover 10. Each of the resilient clips extends away from the flat face 16, and widens out as it extends further away from the flat face 16. A lip is therefore formed at a distal end of each resilient clip. Each of the resilient clips is disposed adjacent an edge of the flat face, and adjacent clips are disposed adjacent alternate edges. In particular, clips 16 and 20 are disposed adjacent an inner edge of the flat face 16, i.e. an edge of the flat face 16 which is adjacent the internal cylindrical surface 12, and clips 18 and 22 are disposed adjacent an outer edge of the flat face 16, i.e. an edge of the flat face 16 which is adjacent the external cylindrical surface 14. On the clips disposed adjacent the inner edge, the lip faces primarily towards the outer edge, and on the clips disposed adjacent the outer edge, the lip faces primarily towards the inner edge.

On the other "arm" of the "U" shaped flat face 16, recesses/sockets 24, 26, 28, 30 are provided corresponding to the shape of the clips 16, 18, 20, 22. Each recess extends into the flat face 16 and widens as it extends deeper, to form an undercut corresponding to the lip of a corresponding resilient clip.

In this embodiment, the two parts 10 of the cover are exactly identical. In FIG. 1 the clips and corresponding recesses are visible on the part which is top-right of the drawing, and not visible on the part which is bottom-left, due to the orientation. However, it will be understood that the clips of each part interface with the recesses of the other part.

Figure 2:
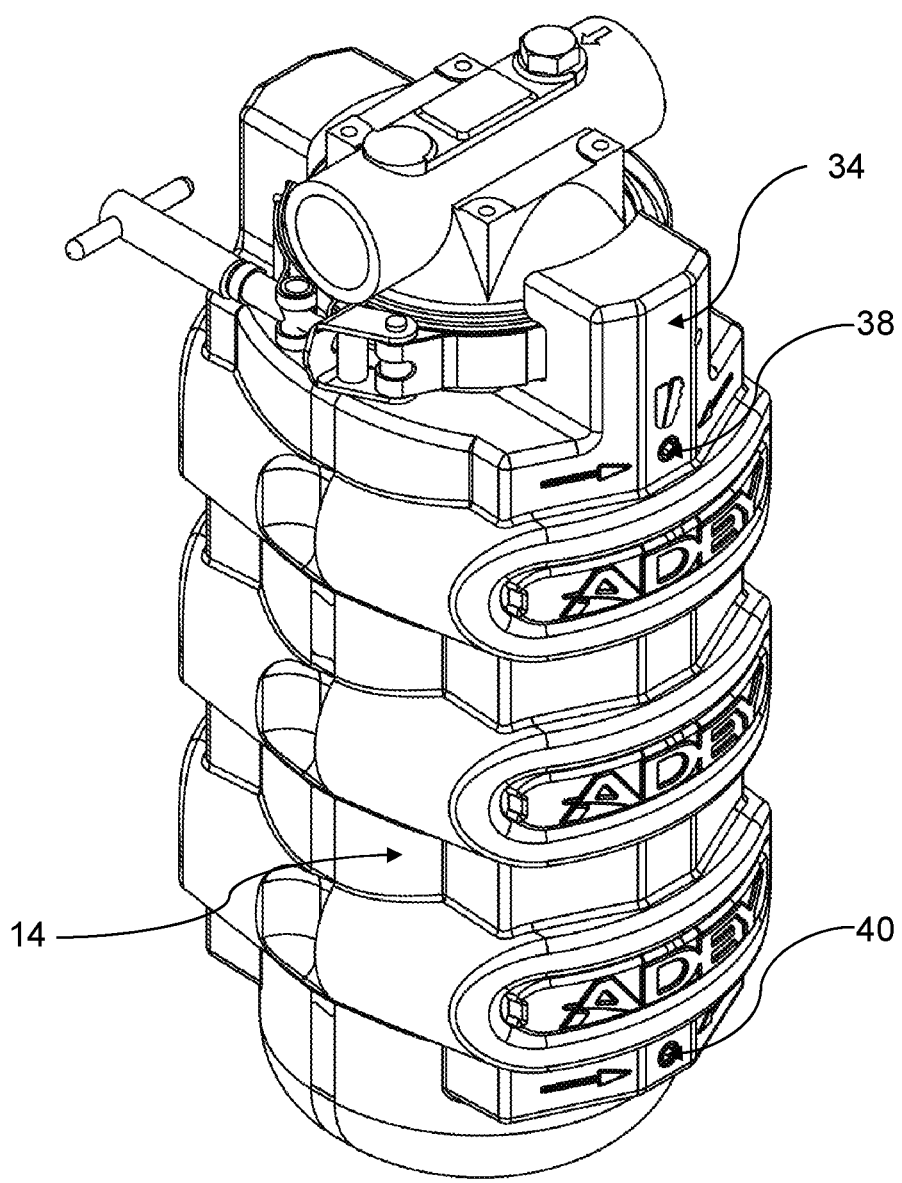
FIG. 2 shows the filter and insulating cover of FIG. 1, with the cover installed on the filter.

When the parts 10 of the cover are pushed together around a filter 100, the clips 16, 18, 20, 22 deform slightly until the lip of each clip is in a respective undercut of a recess. The clips then return to their previous shape and act to hold the two parts 10 firmly together, as shown in FIG. 2.

The cover includes a bottom wall 32 which substantially covers the bottom of the filter 100. The top of the filter is where inlet and outlet pipes are connected and so space needs to be left for valves and other parts to be connected. The cylindrical filter 100 has a flanged section 102 just below the inlet and outlet fittings 104, 106. An extension 34 from the top of each part of the cover includes an interior circumferential slot which corresponds to the position of the flange 102 of the filter when the cover is fitted. This prevents the cover from moving axially in relation to the filter, i.e. prevents the cover from falling off the filter 100 in a downwards direction as shown in the drawings, when the cover is fitted on the filter.

Magnets 36 are disposed on the internal cylindrical surface 12 of each part 10 of the cover. When the cover is fitted to the filter 100, the magnets 36 face towards the outside wall of the filter 100. Magnetic debris which flows through the filter is attracted by the magnets and is held against the interior of the wall of the filter 100. In this case, the filter 100 also has a magnet inside and so the effect of installing the cover is not only to insulate the filter but to improve the magnetic capture performance of the filter. In other cases the filter may not have an internal magnet and therefore the cover may be used to provide magnetic capture capability where there was previously none.

When the filter needs to be cleaned, the cover will need to be taken off, allowing captured magnetic debris to fall away from the interior of the filter wall to be drained out. However, there will be significant magnetic attraction between the magnets 36 and the captured magnetic debris inside the filter. In an embodiment with a stainless steel filter of height around 370 mm with 2 mm thick walls, the force required for removal may be equivalent to about 5 kg. Also, if the force is applied unevenly or to weak parts of the cover, there is a risk that the expanded polypropylene material may be damaged. Therefore, a leadscrew arrangement is provided to assist with removing the cover from the filter.

One each part 10 of the cover, two leadscrews 38, 40 are provided. Each leadscrew is disposed substantially centrally between the two arms of the "U" shaped flat face 16, and extends through an aperture in the cylindrical shell running from the external cylindrical surface 14 to the internal cylindrical surface 12. One leadscrew 38 is close to the top of the cover and one leadscrew 40 is close to the bottom of the cover. A plate 42, 44 with a female threaded bore is provided on the interior side of the cover, corresponding to each leadscrew 38, 40. Hence the screw can be rotated to extend it towards and against the outer surface of the filter 100, levering the cover away from the filter.

Figure 3:
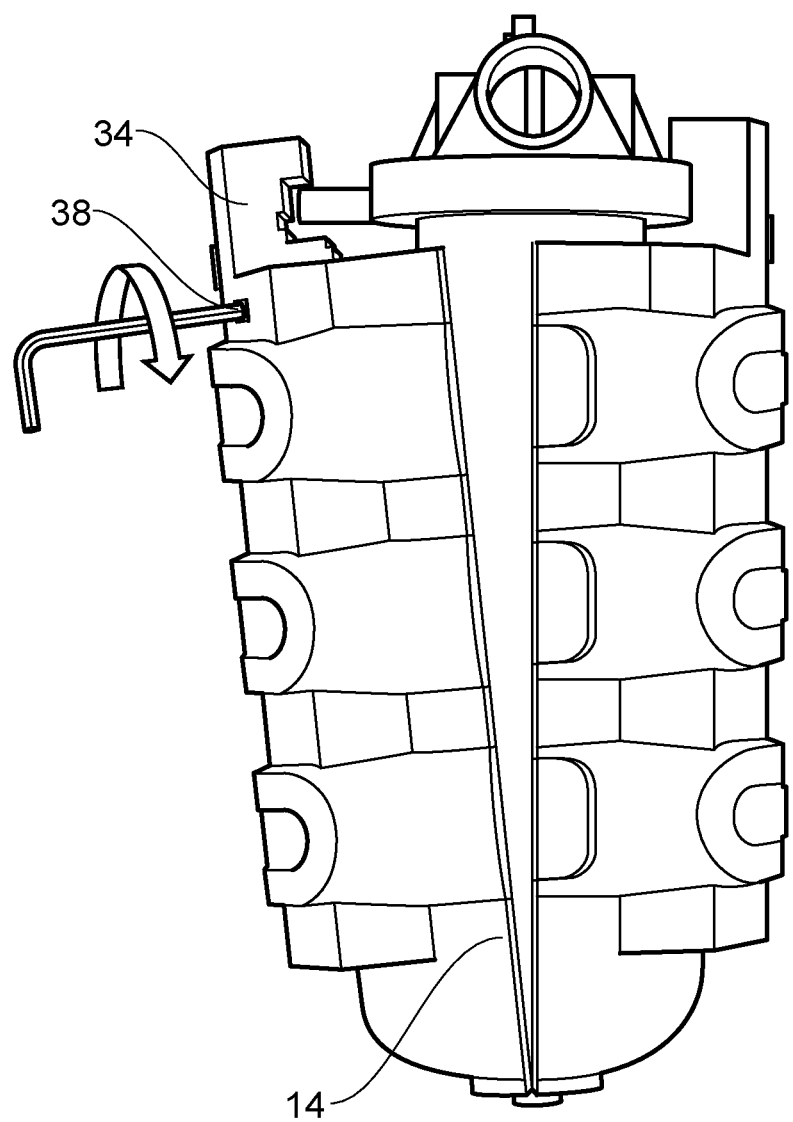
FIG. 3 shows the filter and insulating cover of FIG. 2, when the cover is in the process of being removed from the filter to allow cleaning.

FIG. 3 shows the cover in the process of being removed. By operating the leadscrews one at a time, the cover is slowly levered away from the filter, and a consistent force is applied via the plates 42, 44, at a central point between the two arms of the "U" shaped flat face. This flexes the resilient clips 16, 18, 20, 22 without damaging them, and overcomes the magnetic attraction between the magnets 36 and magnetic debris captured inside the filter 100.

Figure 4:
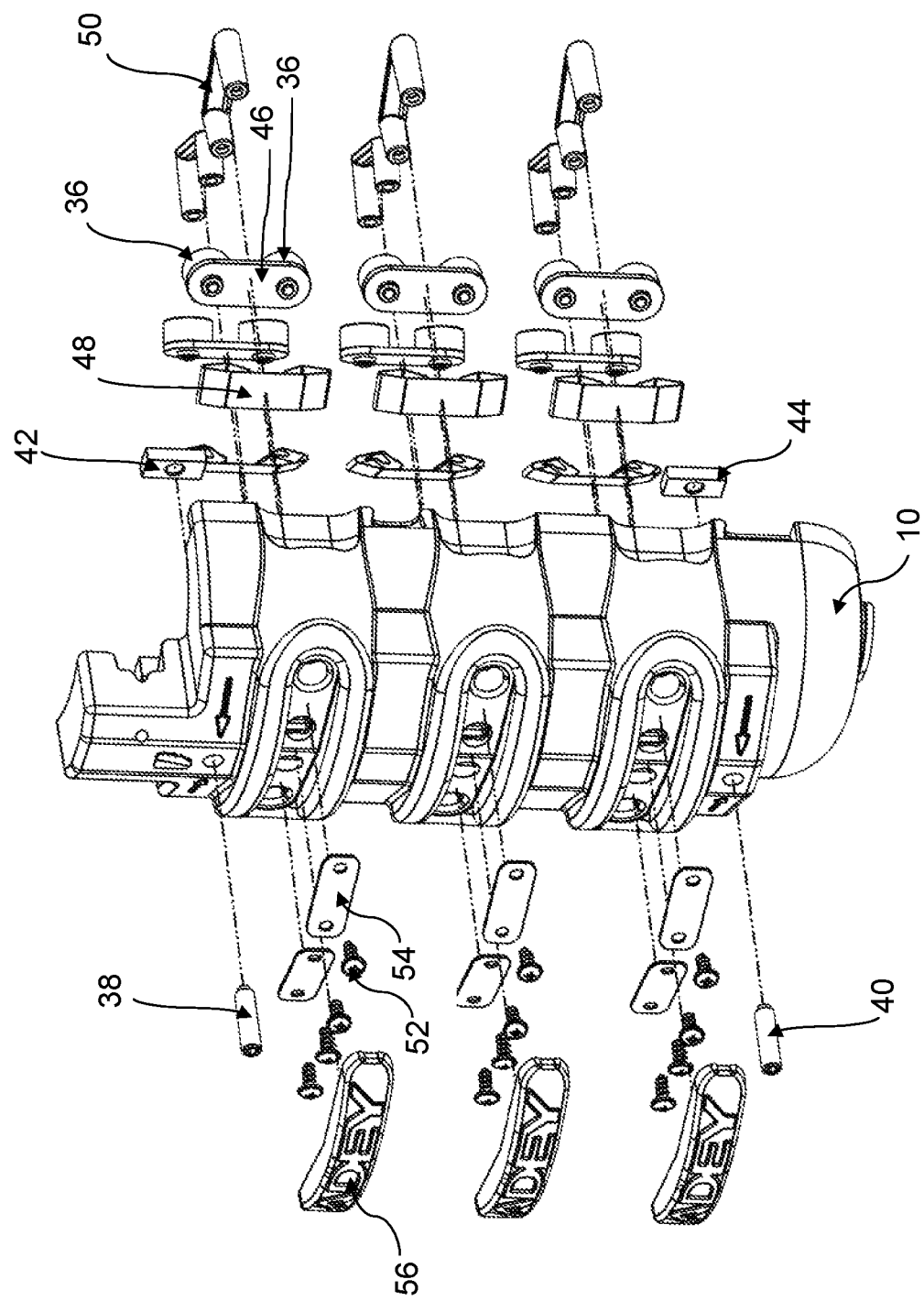
FIG. 4 is an exploded view of the insulating cover.

With reference to FIG. 4, the arrangement of the magnets 36 will now be described in more detail. The magnets 36 are fixed to ferromagnetic carriers 46 in pairs. I.e. on each ferromagnetic carrier there are two magnets 36. Each magnet 36 is in the form of a substantially cylindrical billet with north and south poles on the opposing circular surfaces of the cylindrical billets. The pair of magnets 36 on a single carrier 38 is arranged so that the north pole of one magnet is against the carrier, and the south pole of the other magnet is against the carrier. This tends to focus the magnetic field lines out of the billets on the side facing away from the carrier, which is into the filter when the cover is fitted.

A leaf spring 48 is disposed behind each carrier 46, for urging the carrier 46 and attached magnets towards the surface of the filter.

A force transfer element 50 is provided in the form of a rigid plastic bar which is fixed in front of (i.e. on the interior side of) each carrier 46, between the two magnets 36. The force transfer element is rigidly fixed to the cover 10 by screws. Therefore, when the cover is levered away from the filter, the force transfer elements push against the magnets from the interior side. There does not need to be any "pulling" of the magnets from the exterior side and this means that the spring 48 can be designed without the requirement of high strength under extension.

The force transfer element 50 also provides a pivot on which the carrier 46 may rotate slightly. The pivot is located offset from the central point between the two magnets 36 so that each carrier will tend to rotate in a particular direction. The force transfer elements 50 on the right hand side of FIG. 4 have the pivot offset towards the bottom of the drawing, so the lower magnet 36 in each right-hand pair will tend to detach from the filter surface before the corresponding upper magnet. The force transfer elements 50 on the left hand side of FIG. 4 are the same component, but are oriented so that the pivot is offset towards the top of the drawing, so the upper magnet 36 in each left-hand pair will tend to detach from the filter surface, when the cover is removed, before the corresponding lower magnet.

Where the magnets are fixed to the cover, the cover is provided with formations to receive the magnets and house the various parts of the arrangement. Apertures are provided through the cover for screws 52 to pass through. However, the expanded polypropylene material used to form the cover 10 is relatively soft and does not provide a good reaction surface for the head of the screw. Therefore a plate washer 54 is provided, made for example from thin stainless steel. A plate washer 54 is provided corresponding to each force transfer element 50, and has apertures for two screws 52. The plate washer 54 spreads the load over a wider area of the polypropylene cover. Hence the magnets 36, carrier 46 and spring 48 is clamped between the cover 10 and the force transfer element 50. The force transfer element 50 is attached to the cover by the screws 52 and plate washer 54.

An expanded polypropylene cap 56 covers the heads of screws 52, which in normal use and servicing do not need to be accessed.

The cover of the invention provides an insulating jacket for a filter, whether this is a filter which already has magnetic capture capability, in which case the extra magnets 36 serve to improve the magnetic capture performance of the filter, or a filter which by itself captures debris purely by non-magnetic means (e.g. a mesh, gauze, cyclone or other separation means), in which case the magnets 36 add magnetic capture capability to the filter. The insulating cover is easily removable when the filter needs to be cleaned out. The cover also provides the possibility of retro-fitting magnetic capture capability to a heating system at low cost.

It will be understood that the variations and modifications to the embodiment described may be envisaged, within the scope of the claims.

What is claimed is:

1. An insulating cover for a central heating system filter, the insulating cover being made from a resilient insulating material, and being provided in two parts, the two parts of the cover being releasably attachable to each other by resilient clips, and the two parts of the cover surrounding at least part of the filter, and being retained around the filter, when the two parts of the cover are attached to each other by the clips, and the cover being removable from the filter by releasing the attachment of the two parts of the cover to each other, in which an arrangement of magnets is provided on an inside surface of the cover, the magnets facing towards the filter when the cover is installed on the filter, wherein the magnets are arranged in one or more pairs, each magnet being in the form of a substantially cylindrical billet, and the magnets of each pair being joined together by a ferromagnetic carrier, the magnets are mounted on springs which urge the magnets towards the filter in use, wherein a force transfer element is provided to a side of the carrier facing towards the filter in use, the force transfer element being arranged to push the magnets away from the filter when the cover is removed from the filter, the force transfer element is fixed to the cover by at least two screws, and an apertured plate is provided on the side of the cover facing away from the filter, the screws fixing the force transfer element to the cover passing through the apertures in the plate.

2. The insulating cover as claimed in claim 1, in which the clips are integrally formed as part of the cover.

3. The insulating cover as claimed in claim 1, in which each clip is formed as an extension from a face of one of the two parts of the insulating cover, the extension becoming wider as it extends away from the face to form a lip at a distal end of the extension.

4. The insulating cover as claimed in claim 3, in which the other of the two parts includes a recess in a face, the recess corresponding to a shape of the clip, and the recess including an undercut corresponding to the lip of the clip.

5. The insulating cover as claimed in claim 1, in which a leadscrew arrangement is provided on each part of the two-part cover, for levering the cover away from the filter.

6. The insulating cover as claimed in claim 1, in combination with a filter for a heating system, the filter including an internal magnet.

* * * * *